United States Patent [19]

Lindberg

[11] 4,183,338

[45] * Jan. 15, 1980

[54] COMBUSTION CONTROL SYSTEM ADDING A LIQUID, EXHAUST GASES, AND PCV GASES

[75] Inventor: John E. Lindberg, Berkeley, Calif.

[73] Assignee: U.S.A. 161 Developments Ltd., Berkeley, Calif.

[*] Notice: The portion of the term of this patent subsequent to Sep. 12, 1995, has been disclaimed.

[21] Appl. No.: 793,555

[22] Filed: May 4, 1977

[51] Int. Cl.$^2$ ............................................. F15C 1/16
[52] U.S. Cl. .............................. 123/119 A; 123/25 E; 123/119 B; 123/119 D
[58] Field of Search ............ 123/119 A, 119 B, 119 D, 123/119 EE, 25 E, 25 R; 137/480, 805, 806, 808–813

[56] References Cited

U.S. PATENT DOCUMENTS

| | | | |
|---|---|---|---|
| 3,139,873 | 7/1964 | Gardner | 123/25 E |
| 3,177,858 | 4/1965 | Vanderpoel | 123/119 B |
| 3,530,842 | 9/1970 | Von Brimer | 123/198 A |
| 3,557,763 | 1/1971 | Probst | 123/119 B |
| 4,027,635 | 6/1977 | Sato et al. | 123/119 A |

Primary Examiner—Leonard E. Smith
Attorney, Agent, or Firm—Owen, Wickersham & Erickson

[57] ABSTRACT

A combustion control system adds a fluid and heat energy to the air-fuel mixture of the induction system of an internal combustion engine in response to engine need to improve combustion, to increase power, to improve efficiency, and to reduce emissions.

The system incorporates fluidic control mechanisms which provide the control functions without any moving parts.

The system incorporates one or more variable impedance flow control mechanisms, each of which produces an impedance to flow through the control mechanism which varies in a controlled relationship to the pressure differential across the control mechanism.

In one embodiment, the main variable impedance control mechanism is a vortex chamber. The outlet of the vortex chamber is connected to the positive crankcase ventilation (PCV) inlet to intake manifold downstream of the butterfly valve.

The vortex chamber has inputs for supplying air, the liquid, exhaust gases, and PCV gases for mixing within the vortex chamber. The incoming liquid, air, exhaust gases, and PCV gases are transmitted into the main vortex chamber by input constructions which, in themselves, provide for controlled regulation of both the relative proportions and total amounts of the incoming liquid and gases.

In a specific embodiment, the input constructions include a liquid-exhaust gas acceleration chamber for mixing liquid with exhaust gases and a PCV-exhaust gas vortex chamber for mixing exhaust gases with PCV gases and air and swirl producing devices for causing controlled choking of the inlets of one or more of the vortex chambers.

The system also incorporates a variable impedance syphon break in the line connecting the liquid source with the liquid-exhaust gas acceleration chamber.

42 Claims, 6 Drawing Figures

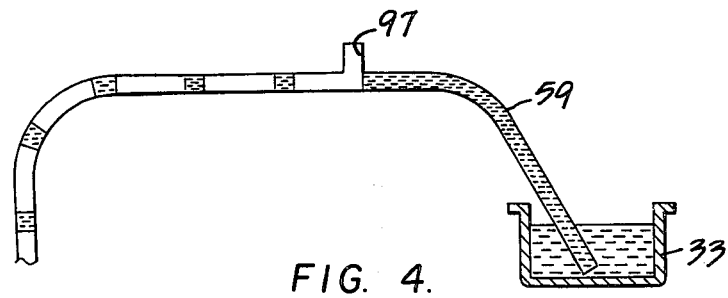
FIG. 4.
Prior Art
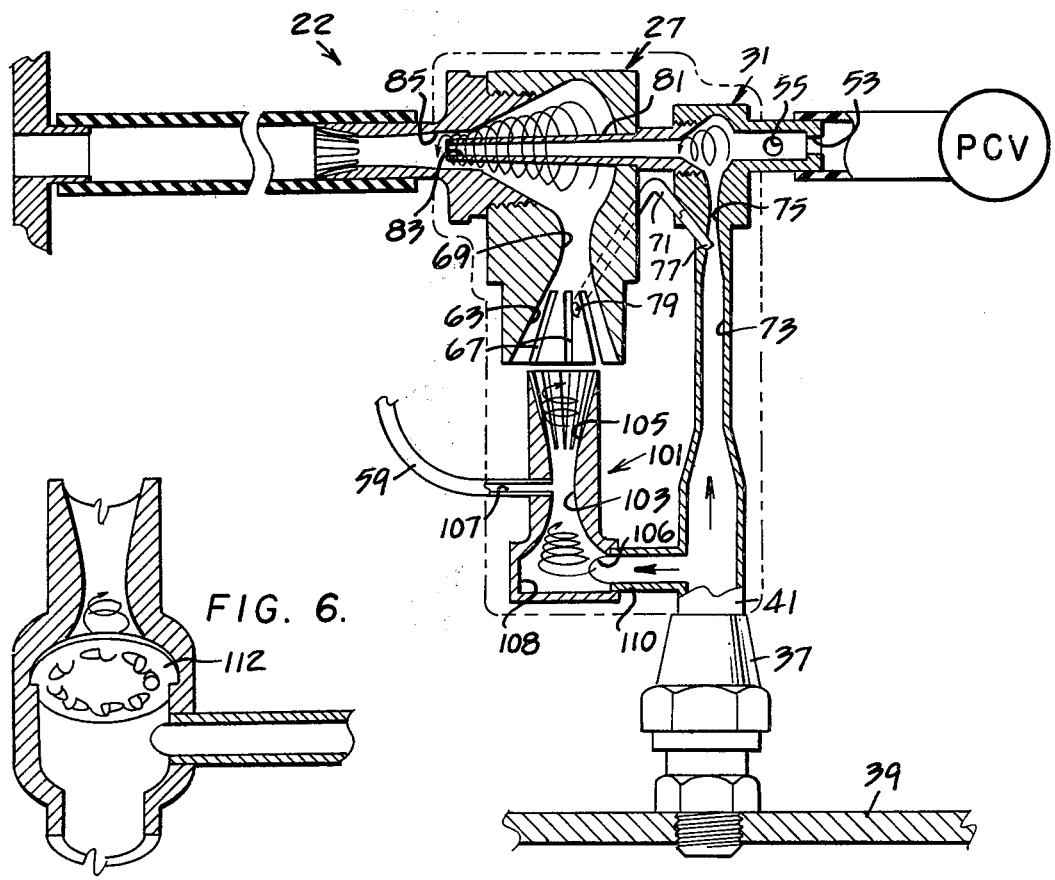
FIG. 5.
FIG. 6.

COMBUSTION CONTROL SYSTEM ADDING A LIQUID, EXHAUST GASES, AND PCV GASES

BACKGROUND OF THE INVENTION

Adding liquids, such as water or water vapor, to the induction system of an internal combustion system is an idea which is in itself quite old. However, the comprehension of the full benefits to be obtained by proper regulation of the amount of added liquid (along with a proper amount of associated heat energy) at all conditions of engine operation have been lacking; and the prior art apparatus and techniques for adding liquid have been inadequate to fully accomplish all the desired results.

The engine needs different amounts of fluid at varying conditions of operation of the engine. The engine's need for fluid at any particular condition of operation is dependent on the amount of fluid which will produce the best engine operation at that condition. The best engine operation includes obtaining complete lean, clean combustion with the lowest emissions of HC, CO and $NO_x$ and best fuel economy without detonation, pre-ignition, or after fire (dieseling). The engine's need for fluid varies widely from no fluid at all under certain conditions of operation to amounts of fluid flow in the same order of magnitude of fuel flow at other conditions of engine operation. For example, the engine's need for fluid is zero at engine shut-off as no liquid can be permitted to flow into the engine when the engine is shut off. If the liquid flow into the engine were to be permitted at shut-off, corrosion and/or liquid lock will occur.

At normal, steady-state, low-speed idle, only a trace amount of fluid, or no fluid at all, is required to give optimum low idle emissions.

Increasing quantities of fluid proportionate to power are required as engine power is increased at each steady state point.

Under dynamic conditions, such as, for example, acceleration at high BMEP, an extra amount of fluid is required over and above operation at a steady state condition; and, in the case where the fluid is steam, the steam should be of a lower quality, that is, with a certain percentage of water droplets carried with the steam (in order to give maximum combustion cooling) to keep nitrous oxide emissions within satisfactory limits.

On deceleration, less fluid is required at each point in the deceleration than would be desired for operation at a steady state at any point (zero fluid at zero throttle deceleration).

The engine's need for fluid is also determined by limiting the fluid to an amount that will not hurt the combustion. For instance, in deceleration, if fluid is not limited, too much fluid can be introduced to cause the combustion to be poor. This will produce incomplete combustion and will cool the flame sufficiently that undesirable amounts of HC and CO will be produced. Engine efficiency can be seriously impaired. Hydrocarbon deposits also increase.

On acceleration, the engine's need for fluid is dependent on introducing the right amount of fluid to absorb, by its high specific heat plus latent heat of evaporation of liquid droplets included (water droplets in the case of steam) plus heat of dissociation, excess engine heat generation, which would otherwise go toward producing high combustion and surface peak temperatures and peak pressures at about top dead center (but this still must be done without introducing too much fluid so as to impair combustion with the undesirable effects noted above). By introducing the right amount of additional fluid, the energy is absorbed as energy in steam (in the case where the fluid is water) which is given back during the latter part of the cycle as expansion of the steam. This adds smoothly at favorable crank angle to the power stroke and torque of the engine. The right amount of additional fluid at this point, therefore, prevents hot spots and smooths the pressure and temperature and energy conversion.

Also, the right amount of fluid needs to be introduced to provide for engine cleanliness. The right amount of fluid will provide both clean combustion and removal of engine deposits.

Further, it is needed to inject the right amount of fluid and heat in order to heat and thereby to vaporize the fuel to give equal fuel-air ratio distribution and mass distribution between the cylinders. This gives maximum economy and lowest emissions.

Extra charge density can be provided by introducing fluid droplets in the fuel-air mixture charge at full throttle or high power operation. The fluid droplets, if introduced into the cylinder at the proper time before valve closure, cool the charge so as to increase the charge density before the valve closure, and thus, in effect, provide a form of supercharging.

Other inventors have not recognized these problems and have not implemented any control mechanism effective to produce the benefits which can be obtained by controlling the amount of added fluid and heat energy in response to engine need at each condition of operation of the engine.

Prior attempts to introduce fluids into the engine have relied primarily on intake manifold vacuum as the driving force to induce liquid flow. This has the disadvantage of having the greatest vacuum (and hence the larger driving force for liquid flow) at the conditions when the engine needs the least or no addition of liquid (throttle closed). In addition when the engine requires the greatest liquid flow (acceleration or heavy load) manifold vacuum is at a minimum. This present invention uses venturis, ejectors and vortex tubes in such combination to provide liquid flow when needed by the engine and not necessarily when most easily injected using intake manifold vacuum.

It is a primary object of the present invention to control the added amount of fluid and heat energy in relation to engine need at all conditions of operation of the engine to obtain the benefits as described above.

SUMMARY OF THE INVENTION

The present invention provides a fluidic computer which provides the basic function of controlling the amount of fluid added, with the proper amount of heat from the exhaust gases, in response to the engine's need for the added fluid at each condition of operation of the engine.

The fluidic computer of the present invention accomplishes this control function with no moving parts.

The fluidic computer uses, as one input, the exhaust gas from the manifold near one cylinder. It also uses, in a preferred embodiment of the present invention, the additional inputs of PCV gases from the PCV valve outlet (preferably with the valve removed), liquid (in a particular embodiment, water) from a reservoir provided in the system, and atmospheric air.

In a preferred embodiment, the mixed liquid, exhaust gases, PCV gases, and air are admitted to the induction system of the engine at the PCV inlet below the butterfly valve.

The fluidic computer of the present invention utilizes the changing vacuum condition at the PCV inlet in combination with the changing exhaust gas pressure and temperature, to control the quantity and quality of the liquid and also to control (in proper relationship to the liquid) the amounts and proportions of each of the gases: exhaust, PCV, and air added. It achieves this control by means of a number of control variables provided by the fluidic computer system itself, and supplies the proper amounts of each of these inputs for each condition of engine operation.

A fundamental feature of the control system of the present invention is a variable impedance flow control mechanism. The control mechanism produces an impedance to flow through the mechanism which varies in a non-linear relationship to the pressure differential across the control mechanism.

In a preferred embodiment of the present invention this flow control mechanism is a main or primary vortex chamber having an outlet connected to the PCV inlet and having inputs connected to two additional variable impedence flow control mechanisms.

In this particular embodiment, either a second liquid-exhaust gas vortex chamber or Venturi device is aligned with an air inlet for the first or main vortex chamber; and a third PCV-exhaust gas vortex chamber mixes air, PCV gases, and exhaust gases and then transmits these mixed gases to the main or primary vortex chamber through another inlet to that main vortex chamber.

In a specific embodiment, each of the variable impedance flow controls mechanisms incorporates a shaped inlet for providing a controlled choking of that inlet to further regulate the flow through the variable impedance flow control mechanism under varying conditions of engine operation. Each of these shaped inlets provides a control function which can be varied to match the overall control system to a particular engine.

The liquid-exhaust gas variable impedance flow control mechanism is also disposed in spaced relationship to the inlet of the main vortex chamber. The amount of controlled coupling and de-coupling between the outlet of this liquid-exhaust gas vortex chamber or Venturi and the inlet to the main vortex chamber provides two control functions. The amount of decoupling assists in providing a controlled amount of isolation of the suction exerted on the liquid introduced into the liquid vortex chamber or Venturi. The degree of coupling also provides a variable control on the amount of choking of the inlet to the main vortex chamber.

The inlets to the main vortex chamber and to the PCV-exhaust gas vortex chamber are interconnected by a cross tube to provide a reversal of choking effect on each of these inlets at a certain point in engine operation. The cross tube and the way in which it is associated with the two inlets provides a high degree of choking of each of the inlets at idle (to minimize or to totally eliminate the amount of liquid and to keep at a controlled amount the amount of PCV gases transmitted to the engine at idle and also to minimize the amount of exhaust flow at idle). When the engine accelerates above idle, the cross tube reverses the choking effect both to provide increased flow of exhaust gases to the PCV-exhaust gas vortex chamber and also to provide increased flow of air, liquid, and exhaust gases through the inlet of the main vortex chamber.

In a preferred embodiment of the present invention, the control system also incorporates a variable impedance siphon break in the conduit transmitting liquid from the source to the liquid vortex chamber or Venturi. The variable impedance siphon break, in a specific embodiment of the present invention, is a vortex chamber which admits atmospheric air to the vortex chamber in relation to the amount of suction exerted on the outlet end of the liquid conduit disposed within the liquid vortex chamber or Venturi, but mixes the air with the fluid in the conduit in a non-linear relationship to the change of the amount of suction. That is, the variable impedance siphon break functions to discontinue liquid flow through the conduit at idle, because there is very little suction exerted on the outlet end of the liquid conduit at idle, and progressively mixes less air with the liquid in the conduit as the suction within the liquid vortex chamber or Venturi increases as the engine accelerates above idle.

The control system of the present invention uses the large number of control variables afforded, as noted above, to provide, in effect, a reversal of the amount of liquid and exhaust gas heat added in relation to decreasing vacuums at the PCV inlet so that no liquid is added at conditions of highest engine suction, idle, or deceleration, and also so that maximum amounts of liquid and exhaust gas heat are added (in proper combination with controlled amounts of added air and PCV gases) when the engine is operated at maximum power level.

The amount of exhaust gas heat, air, and PCV gases are properly controlled in relation to the amount of added liquid in a controlled relationship to meet the engine's need for each of these inputs at each condition of engine operation. The overall result of the combustion control system of the present invention is to produce improved engine combustion at each condition of operation, increased maximum power, improved fuel economy, and lower emissions and reduced octane requirement.

Combustion control systems having the structural features noted above and effective to function in the ways described above, constitute further, specific objects of the present invention.

Other and further objects of the present invention will be apparent from the following description and claims, and are illustrated in the accompanying drawings, which, by way of illustration, show preferred embodiments of the present invention, and the principles thereof and what are now considered to be the best modes contemplated for applying these principles. Other embodiments of the invention, embodying the same or equivalent principles may be used, and structural changes may be made as desired by those skilled in the art without departing from the present invention and the purview of the appended claims.

BRIEF DESCRIPTION OF THE DRAWING VIEWS

FIG. 1 is taken along the line and in the direction indicated by the arrows 1—1 in FIG. 3.

Figure 1:
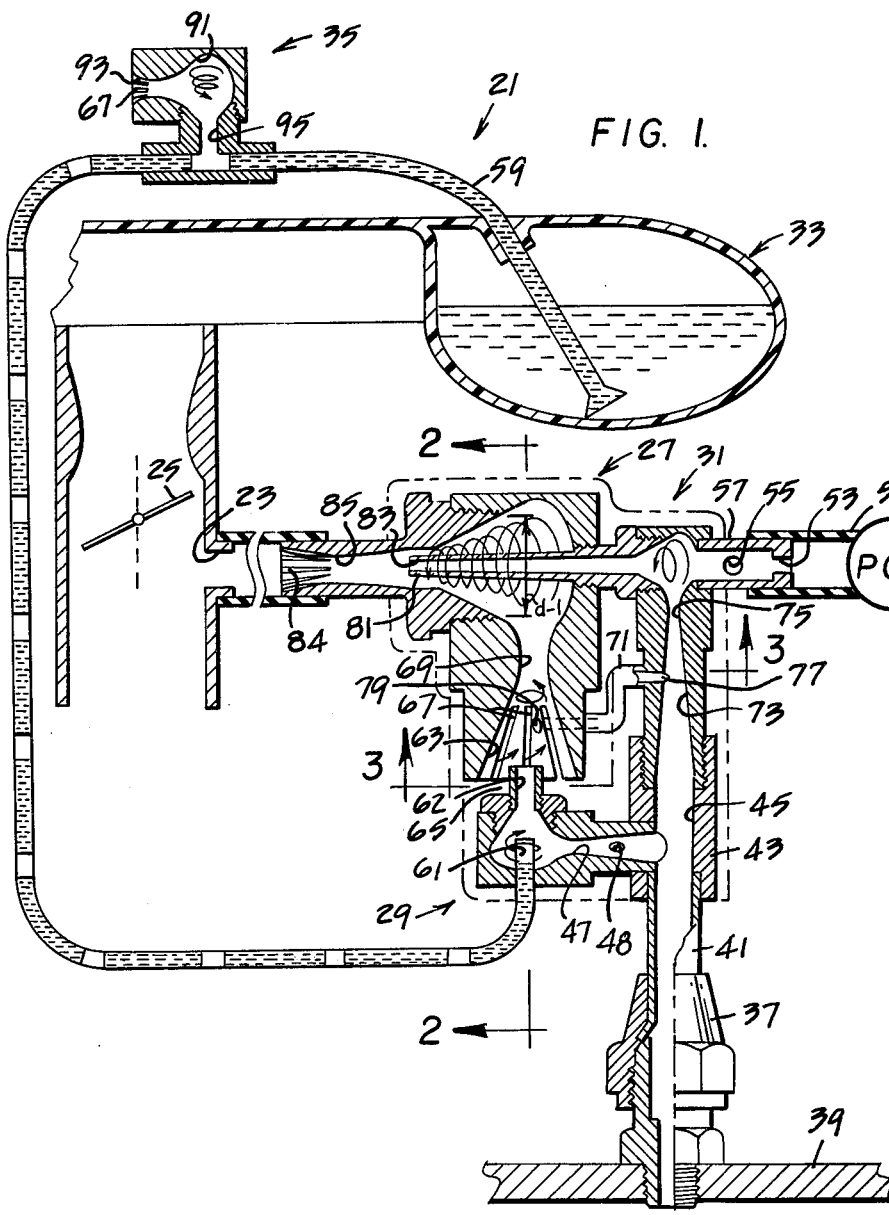
FIG. 1 is an elevation view, partly in cross section to show details of construction, of a combustion control system incorporating a vortex device and constructed in accordance with one embodiment of the present invention.
Figure 3:
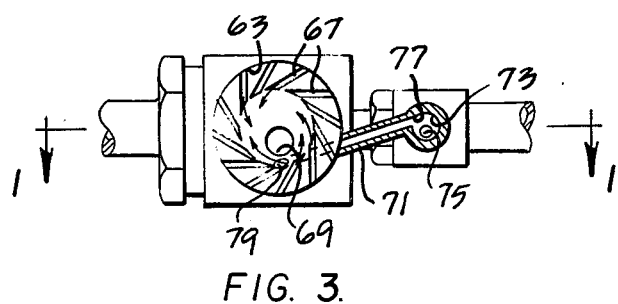

FIG. 3 is a view taken along the offset line 3—3 and taken also in the direction indicated by the arrows 3—3 in FIG. 1. FIG. 3 shows a tube extending between the inlet of the air vortex chamber and the inlet of the exhaust vortex chamber. This tube utilizes the ram pressure of the pressure in the inlet of the air vortex chamber for aiding rotation set up in the cone of the inlet of the exhaust vortex chamber to aid the spinning in the inlet cone of the exhaust vortex chamber at idle thereby to reduce the amount of the exhaust that enters the exhaust vortex chamber at idle. This tube shown in FIG. 3 acts in an opposite way as the power goes up in the exhaust manifold pressure to cause the higher exhaust gas pressure both to stop the spinning in the exhaust vortex chamber entrance and also to lessen the spinning in the air vortex chamber inlet.

FIG. 4 is a side elevation view of a prior art type of siphon break and is included for a comparison to the variable impedance siphon break shown in the FIG. 1 embodiment. The FIG. 4 prior art type of siphon break does not offer the benefits of the variable impedance siphon break shown in the FIG. 1 embodiment.

FIG. 5 is a side elevation view, partly in cross section to show details of construction, like FIG. 1 but incorporating a Venturi construction for the liquid inlet to the air vortex chamber rather than a liquid vortex chamber construction like the FIG. 1 embodiment.

FIG. 6 is a fragmentary, enlarged view of a modified construction for imparting spin to the exhaust gases entering the Venturi construction of the FIG. 5 embodiment.

DESCRIPTION OF THE PREFERRED EMBODIMENTS

A combustion control system incorporating a vortex device and constructed in accordance with one embodiment of the present invention is indicated generally by the reference numeral 21 in FIG. 1.

The system 21 is constructed to inject a mixture of liquid vapor, or in some cases liquid droplets, air, exhaust gases and PCV gases through an opening 23 which is the existing PCV entrance (positive crankcase ventilation) to the manifold below the carburetor butterfly 25.

As used in this specification, PCV gases means the gases produced by positive crankcase ventilation.

The major components of the system 21 shown in FIG. 1 comprise an air vortex chamber 27, a liquid vortex chamber 29, an exhaust gas and PCV gas vortex chamber 31, a liquid reservoir 33, a siphon break 35.

In a particular embodiment, the smallest vortex chamber is the vortex chamber 29, which is about one-half the diameter of the vortex chamber 31, and the vortex chamber 31 is two-thirds the diameter of the vortex chamber 27.

Engine exhaust gases are conducted from an outlet fitting 37 connected to the exhaust gas manifold 39 of the engine immediately adjacent to one of the cylinders, so as to obtain the highest exhaust gas temperatures. These exhaust gases are conducted through a conduit 41 to a branched fitting 43 which provides one conduit 45 for conducting a portion of the exhaust gases to the exhaust gas vortex chamber 31 and which provides a second conduit 47 for conducting some of the exhaust gases to the liquid vortex chamber 29.

In a preferred form of the invention, the vortex chambers are insulated by thermal insulation (indicated by the dashed outline in FIG. 1) to preserve the heat of the exhaust gases used in the vortex chambers.

The structural part of the system 21 containing the vortex chambers 27, 29 and 31 is preferably located as closely as possible to an exhaust valve in the exhaust manifold 39 to maximize the amount of heat which is transmitted to these vortex chambers.

The PCV gases are conducted to the exhaust gas vortex chamber 31 by means of a PCV fitting 49 connected to the rocker box cover of the engine in the normal manner. A tubular conduit 51 carries the PCV gases to a control orifice 53, and the control orifice 53 regulates the flow of the PCV gases to the exhaust gas vortex chamber 31.

Bleed or additional air for combustion control is also admitted to the exhaust gas vortex chamber 31 through an opening 55 formed in a sidewall of the conduit 57 leading axially into the interior of the exhaust gas vortex chamber 31.

Liquid from the reservoir 33 is conducted to the liquid vortex chamber 29 through a conduit 59. The liquid conducted through the conduit 59 can be, for example, water alone, or water plus one of the following: alcohol, hydrogen peroxide, ammonia, upper cylinder lubricants, or solvents or other additives as desired.

The inlet end 61 of the conduit 59 is located within the interior of the liquid vortex chamber 29 on the axial center line of the liquid vortex chamber 29. The extent to which the end of the inlet tube 61 extends into the vortex chamber provides a control variable regulating the amount of suction exerted on the liquid inlet 61 of the conduit 59.

A second control parameter for regulating the amount of suction is the diameter of the inlet tube 61, particularly in relation to the overall diameter of the interior of the vortex chamber.

Thus, moving the inlet end 61 further into the interior of the vortex chamber 29 (upward as viewed in FIG. 1) increases the suction. In addition providing a smaller diameter for the inlet tube 61 increases the suction.

The purpose of the siphon break 35 is to disconnect the liquid reservoir 33 from the liquid vortex chamber 29 on three conditions—engine off, engine idle, and engine deceleration. The way in which the siphon break 35 performs these functions will be described in more detail below.

The siphon break 35 also provides another function. It aids in controlling the rate of increase of fluid flow in relation to increase of engine power, and this will also be described in greater detail below.

The siphon break 35 also serves as protection against liquid lock. When the engine is off, the siphon break 35 physically breaks the siphoning effect of the conduit 59 with respect to the liquid in the reservoir 33 so that no liquid can flow through the conduit 59 when the engine is off.

The present invention incorporates a number of additional protections against liquid lock.

The outlet end 61 of the conduit 59 is disposed within the liquid vortex chamber 29 at a level which is below the level of the PCV inlet 23 so that, even in the event of some failure of the siphon break 35, liquid cannot flow upward from the outlet end 61 to the inlet 23 when the engine is not operating.

Further, any liquid flowing through the conduit 59 in the event of the failure of the siphon break 35 has a large number of outlets so that it could never accumulate to a point where it could overflow into the opening 23. For example, the water flowing from the outlet 61 has a free path through the conduit 47 and conduit 41 to the interior of the exhaust manifold 39. The fluid also has a free outlet from the outlet end 61 through the conduit 62 and out the opening between the liquid vortex chamber 29 and the inlet 63 of the air vortex chamber 27. There are also outlets through the slots 67.

Air is admitted to the air vortex chamber 27 through a curved opening 63. In the embodiment shown in FIG. 1 the curved opening 63 has a generally conical shape so that the diameter of the opening 63 decreases with nearness to the interior of the air vortex chamber 27.

The air comes into the opening 63 both through the space 65 between the outlet of the liquid vortex chamber 29 and the inlet to the curved opening 63 and also through slots 67 formed in the sidewall of the curved opening 63 and disposed tangentially to the inner surface of the curved opening 63 at the upper, inner end of each slot 67. See FIG. 3.

Figure 2:
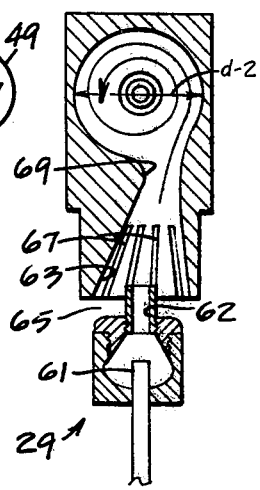
FIG. 2 is a cross section view taken along the line and in the direction indicated by the arrows 2—2 in FIG. 1.

Air coming into the curved opening 63 is transmitted to the interior of the air vortex chamber 27 through a throat 69. The throat 69 comes in generally tangential to one side of the interior of air vortex chamber 27. See FIG. 2.

As illustrated in both FIG. 1 and FIG. 3, a branch conduit 71 interconnects the interior of the curved opening 63 with a tapered passageway 73 for conducting the exhaust gases from the conduit 45 to the interior of the exhaust vortex chamber 31.

The tapered passageway 73 has formed, at the upper end as viewed in FIG. 1, a throat 75 of minimum diameter at the point of connection to the interior of the exhaust gas vortex chamber 31. This throat 75 is aligned tangentially with the interior of the vortex chamber 31 in the same way as the throat 69 is aligned tangentially with the interior of the vortex chamber 27.

The end 77 of the conduit 71 which connects to the tapered passageway 73 is, as illustrated in FIG. 3, connected tangentially to the inside surface of the passageway 73 for a control purpose which will be described in more detail below.

As also illustrated in FIG. 3 the other end 79 of the conduit 71 connected to the interior of the curved opening 63 is also aligned tangentially with the interior of that opening, but in opposition to the tangency of the slots 67, and the control purpose for this alignment will also be described in greater detail below.

The outlet of the exhaust gas vortex chamber 31 comprises a tapered tube 81 which extends completely into the interior of the air vortex chamber 27. The extent to which the outlet tube 81 extends into the interior of the air vortex chamber 27 provides a control parameter for regulating the amount of air and liquid introduced through the air vortex chamber 27 as the power of the engine increases depending upon the length of the tube 81. That is, to maximize the amount of air and liquid transmitted through the air vortex chamber 27, the length of the tube 81 is increased to give an ejector like action at the outlet of the vortex chamber 27, as illustrated in FIG. 1. The tube 81 may extend completely through the length of the air vortex chamber 27 so that the outlet end 83 is so disposed with respect to the outlet 85 of the air vortex chamber 27 as to give an ejector like action for increasing the flow through the air vortex chamber 27.

As illustrated in FIG. 1, the outlet 85 is preferably formed as a true Venturi so that the outlet end is of an expanding shape so that a true Venturi action is provided to minimize restriction to flow through the opening 85 at all conditions of flow encountered in normal operation.

However, to increase the turbulence at the end of the outlet 85 of the air vortex chamber, the inside surface of the end of the outlet 85 can be formed with serrations or grooves 84 extending parallel to the axis of the outlet 85. These serrations or grooves can also be located at the minimum throat area of the exit Venturi 85 and serve to produce an ultrasonic wave form in the fluids flowing through this outlet.

The existing PCV opening 23 in the inlet manifold is a convenient point for introducing the mixture of air, liquid, exhaust gases, and PCV gases of the system 21 shown in FIG. 1 for a number of reasons. This opening is present in most conventional automobile engines, it is easy to make a connection to, and the pressure below the butterfly valve 25 does have a relationship to the amount of additional air and liquid that it is desired to introduce through the opening 23 at the various engine operating conditions.

However, the relationship is an inverse relationship. That is, the highest vacuum below the butterfly valve 25 at the opening 23 exists at idle and the lowest vacuum exists at full throttle. At idle and at engine deceleration, it is desirable that no water or other liquid or liquid vapor be introduced; and the maximum amount of liquid and additional air should be introduced through the opening 23 at full throttle. Thus, the relationship between the pressure differential across the air vortex chamber 27 produced by various conditions of engine operation is inversely related to the amount of materials to be injected through the opening 23 at the various engine operating conditions.

It is a general principle of operation of a vortex chamber that the flow through the vortex chamber varies as the square root of the pressure differential across the vortex chamber. The effect of the vortex chamber 27, by itself, and disregarding for the moment the configured inlet 63 to the vortex chamber, is therefore to reduce the effect of the pressure differential across the vortex chamber in relation to the flow through the vortex chamber by a factor which can be as great as 5:1 or even somewhat greater, depending upon the actual amount of the vacuum below the butterfly valve 25.

A vortex chamber is capable of offering a greater impedance to a given flow than other simple flow restrictions because it induces additional pressure drop by rotational flow. It presents, therefore an inherently more non-linear response than a nozzle or orifice. By feeding one vortex from another vortex, this effect may be compounded such that a small difference in flow may induce a very large change in flow resistance. Such is the case with the controlled vortex in converging passage 63 feeding vortex chamber 27.

The vortex chamber 27, again standing by itself, therefore acts as a variable impedance device whose impedance to flow increases with an increase in the differential across the vortex chamber.

The system 21 of the present invention also incorporates a fluidic valve at the entrance to the air vortex chamber 27 which also functions as a variable impedance device but whose impedance can be controlled and varied by the structural features incorporated in or associated with the entrance.

Thus, the fluidic valve formed at the entrance to the air vortex chamber 27 acts to further choke off flow, in the embodiment shown in FIG. 1, at idle and on engine deceleration to achieve substantially a complete cut off of flow through the air vortex chamber 27 under these conditions of engine operation.

The impedance of this fluidic valve is controlled by the slots 67 which increase the spinning effect to increase the choke effect as the pressure differential across the vortex chamber 27 increases.

The slots 67 thus act to increase the impedance with increasing pressure differentials (with increasing vacuum in the engine inlet manifold below the butterfly valve 25).

In the embodiment of the system 21 shown in FIG. 1 the liquid vortex chamber 29 and the branch conduit 71 are normally arranged to reduce the impedance of the fluidic valve at the inlet to the air vortex chamber 27 with increasing exhaust gas pressure produced by higher power levels of operation of the engine.

Thus, the liquid vortex chamber 29, in the embodiment shown in FIG. 1, injects the liquid and exhaust gases into the curved inlet 63 with a direction of spin that is opposite to the direction of spin produced by the slots 67; and the branch conduit 71 transmits pressurized exhaust gases from the conduit 43 to the curved inlet 63 in a direction of spin which is also opposite the direction of spin produced by the slots 67. The water vortex chamber 29 and the branch conduit 71 thus reduce the impedance of the fluidic valve at the inlet to the air vortex chamber 27 as the engine power increases and this tends to increase the amount of materials which flow through the air vortex chamber 27 as the engine power goes up, even though the vacuum below the butterfly valve 25 is decreasing as the engine power goes up.

It should be noted, however, that the direction of spin at the outlet of the liquid vortex chamber 29 can be aligned to be in the same direction as the direction of spin imparted by the slots 67 to provide an increased choking effect in the inlet 63 with increasing engine power if this is required for a particular engine application.

The main reversal effect of the system 21 shown in FIG. 1 (that is the increase of injected liquid, air, exhaust gases and PCV gases with increased engine power and decreased vacuum below the butterfly valve 25) is however provided by the ejector effect of the outlet end 83 of the tube 81 at the outlet 85 of the air vortex chamber.

As the engine power goes up, the pressure of the exhaust gases transferred through the conduit 41 and the shaped inlet 73 to the exhaust gas vortex chamber 31 increases, and this increases the flow through the exhaust gas vortex chamber 31.

The shaped inlet 73 to the exhaust gas vortex chamber 31 in combination with the branch conduit 71 provides a step function change in the operation of the exhaust gas vortex chamber 31 to accomplish both a choking effect on the inlet to the exhaust gas vortex chamber 31 at idle and deceleration and at low rpm (to desirably restrict the flow of exhaust gas to the intake manifold under these conditions of engine operation) and also to remove the choking effect and thereby to permit increased flow through the exhaust gas vortex chamber at higher rpm all the way up to maximum power.

These results are produced as follows.

At idle and at low rpm and under deceleration conditions, the pressure at the end 79 of the branch conduit within the shaped opening 63 is enough greater than the pressure at the end 77 of the branch conduit within the inlet 73 so that the flow through the branch conduit 71 is from the opening 79 to the opening 77, and this causes the spin within the inlet 73 to cause a choking effect to restrict the flow of exhaust gases through this inlet 73 to the exhaust gas vortex chamber 31 at idle and below, for example at 900 rpm and below. As the exhaust gas pressure is increased, however, at higher engine rpms, the pressure at the end 77 becomes greater (between 900 and 1500 rpm) than the pressure at the end 79 so that the direction of flow of gases through the conduit 71 reverses; and this decreases the choking effect in the inlet 73 (while simultaneously decreasing the choking effect in the opening 63 also because of the direction of spin); and the effect on the exhaust gas vortex chamber 31 is to permit a substantially increased amount of exhaust gases to flow into and through the vortex chamber 31. This in turn draws in more air through the air inlet opening 55, draws in a greater amount of PCV gases through the control orifice 53 and acts through the ejector effect at the outlet end 83 of the tube 81 to augment or draw more air and entrained liquid from the air vortex chamber 27 (providing the reversal effect with relationship to the decreasing vacuum below the butterfly valve 25 with increased engine power as described above).

The exhaust gas vortex chamber 31 in combination with the shaped inlet 73 and branch connector 71 thus provide the desired mode of operation of restricting the flow of exhaust gases and PCV gases to the engine at idle and deceleration.

As illustrated in FIG. 1, the inlet 47 to the liquid vortex chamber 29 may also be provided with a tapered configuration as illustrated, and with an air bleed hole 48 which comes in tangentially to the tapered inlet. The combination of the tapered configuration and the tangential air bleed 48 further restricts the amount of exhaust gases admitted to the liquid vortex chamber 29 (and thus the air vortex chamber 27) at idle and on deceleration. This restriction on the inlet to the vortex chamber 29 also cuts down the amount of liquid which can flow out of the vortex chamber 29 at idle and on deceleration.

On acceleration, the increased pressure of the exhaust gases removes the choking effect by eliminating the swirling effect to provide the full, desired amount of liquid from the liquid vortex chamber 29 on acceleration.

The system 21 substantially reduces the amount of PCV gases transmitted through the inlet 23 at engine idle, deceleration, and low rpms (over what would be introduced without the choking effect of the shaped inlet 73) while permitting greater amounts of PCV gases to be transmitted through the exhaust gas vortex chamber 31 to the inlet 23 at higher engine rpm and exhaust gas pressures; but the overall result is a substantially stabilized and moderate increase of PCV gas flow with increasing engine power over the entire range of engine operating conditions. This results from the combination of the choking and de-choking of the entrance 73 and the basic principle of operation of the vortex chamber 31 (which basic principle is to provide a mass flow which is related to the square root of the pressure differential across the vortex chamber).

The total flow through the exhaust gas vortex chamber 31, however, increases substantially with the increased exhaust gas pressures to produce an increased ejector effect at the outlet end 83 for providing increased mass flow of fluid through the air vortex chamber 27 with increased power levels of operation of the engine.

The stabilized effect on the regulation of the flow of the PCV gases produced by the system of the present invention permits the conventional, existing PCV valve to be eliminated, is desired; or the system 21 can be used with the conventional PCV valve in place.

The liquid vortex chamber 29 is, in most respects, effectively de-coupled from the curved entrance 63 to the air vortex chamber 27. This is achieved by the space 65 between the outlet of the liquid vortex chamber 29 and the entrance 63 and also by the effect of the slots 67 which, as described above, provide a spin which is in opposition to the direction of the materials flowing out of the liquid vortex chamber 29.

The slots 67 thus provide a substantial choke effect which effectively de-couples the liquid vortex chamber 29 under idle conditions, deceleration, and low rpm operation of the engine.

It should be noted, however, that the outlet of the liquid vortex chamber 29 can be utilized to produce an ejector effect, like the output end 83 of the exhaust gas vortex chamber 31. The extent of this ejector effect is dependent upon the location of the outlet end 62 with respect to the curved opening 63. Thus, by extending the outlet end of the conduit 62 higher into the tapered opening 63, a greater ejector effect is obtained. Similarly by extending the end of tube 83 (discharge of vortex chamber 31) further into the throat 85 of the outlet to vortex chamber 27 a greater ejector effect may be obtained. These ejector effects can also be utilized to provide, in effect, a reversal of the mass flow through the air vortex chamber 27 with respect to the normal flow of material through the air vortex chamber 27 which would be produced by the pressure differential resulting from the changing vacuum conditions below the butterfly valve in the inlet manifold.

A further control parameter for controlling the mass flow of the material introduced through the opening 23 is obtained by making the outlet 85 in the shape of a Venturi having a smaller minimum diameter than the minimum diameter of the outlet of the air vortex chamber 27, so that the Venturi throat itself provides a choking effect on the outlet of the air vortex chamber 27. The choking effect, in a preferred embodiment of the present invention, is made a variable choking effect by providing counter rotation for the materials flowing out of the outlet end 83 with respect to the materials flowing through the outlet of the air vortex chamber 27. That is, in a preferred embodiment, the directions of spin are opposite and changing mass flows provide changes in the choking effect. In another embodiment, the directions of spin can be in the same direction, but this provides less response of change in choking effect with changes in more flows, but it has the advantage of creating greater turbulence.

In a preferred embodiment of the present invention at low power, the primary spin is provided by the spinning mixture from the outlet of the air vortex chamber 27, while at high power the primary spin is provided by the spinning mixture leaving the outlet 83 of the exhaust gas vortex chamber 31.

At full power, it is desirable that the energies of these two rotating mixtures be balanced to minimize the choking effect. Therefore, the relative sizes of the inside diameter of the outlet tube 83 and the diameter of the outlet end 85 of the air vortex chamber 27 are so related that the mass flows and directions of spin of these two mass flows balance each other out.

The vortex chambers 27, 29, and 31 act in a beneficial way in conjunction with the pulsed, peaked characteristic of the exhaust gas pressure produced by picking up the exhaust gas pressure near the exhaust valve. This is, the pressure of the exhaust gas transmitted through the conduit 41, 45, and 47 varies in a cyclic way with alternate pressure peaks rather than remaining at a steady state, uniform pressure level at any given condition of engine operation. The vortex chamber provides a stabilizing, de-sensitizing effect because the flow through the vortex chamber is dependent upon the square root of the pressure differential across the vortex chamber, rather than being linearly proportional to the differential pressure across the vortex chamber.

The vortex chamber thus acts somewhat like a rectifier with respect to the pulses in the exhaust gas pressure.

In another embodiment of the present invention, as noted above, the two mass flows are permitted (as illustrated in FIG. 1) to spin in the same direction. While this provides an increased choking effect, it also provides increased turbulence of the flow going through the opening 23 and into the inlet manifold thereby to provide better mixing with the air and fuel. In this embodiment of the present invention, the other control parameters can be and are utilized to provide the desired relationship of increased liquid and injected air flow within increasing engine power levels. That is, there are enough control variables in the system 21 shown in FIG. 1 to permit the desired relationship of mass flows with changing suction below the butterfly valve 25 to be realized, even though the directions of spin at the outlets 83 and 85 are in the same direction.

For this particular embodiment of the present invention, the opening 85 need not be a Venturi, but can be a straight tubular opening since a choking effect and change in the choking effect is not relied on at this point.

In a particular embodiment of the present invention, the system 21 has been installed on a Dodge Dart slant six cylinder 225 cubic inch displacement engine.

In this embodiment, the system 21 shown in FIG. 1 incorporates the specific structural features having the dimensions and particular relationships described below.

The ported vent opening 23 has a diameter of 0.250 inch.

The minimum diameter of the exit Venturi 85 is 0.128 inch.

The diameter d-1 shown in FIG. 1 is 0.4375 inch; and, in this specific embodiment, the tube end 83 terminates at the location indicated by the diameter d-1 (rather than extending further into the outlet Venturi 85, as illustrated in FIG. 1). The tube 83 is ⅛ inch long, measured from the point at which it enters the vortex chamber 27 to the end of the tube.

The air vortex chamber 27 imparts a counterclockwise direction of spin to the air and liquid (as viewed from a direction looking from the back of the vortex chamber 27 toward the ported vent 23).

The maximum diameter d-2 of the air vortex chamber 27 is 0.575 inch. (See FIG. 2.)

The equivalent maximum diameter of the exhaust gas-PCV gas vortex chamber 31 is 0.45 inch.

The equivalent maximum diameter of the liquid vortex chamber 29 is 0.37 inch.

The diameter of the orifice 55 is 0.052 inch.

The diameter of the restricter 53 is 0.092 inch.

The minimum diameter of the throat 75 is 0.120 inch.

The inside diameter of the tube 83 is 0.215 inch.

The inside diameter of the tube 71 opening into the throat 73 is 0.08 inch.

The length of the space 65 between the housing for the liquid vortex chamber 29 and the inlet of the curve opening 63 is 0.04 inch.

The conduit 59 has a 1/32 inch inside diameter.

The slots 67 are 0.062 inch wide. There are twelve slots 67.

The inside diameter of the conduit 41 is 0.29 inch. The outside diameter of this conduit is ⅜ inch and the fitting 37 is a ⅜ inch flare pipe fitting the standard ⅛ inch fitting illustrated to enter into the sidewall of the exhaust manifold 39.

The conduit 59 has a 3/32 inch outside diameter and a 1/32 inch inside diameter. The inside diameter of the outlet 62 is 0.125 inch.

The minimum diameter at 69 is 0.165 inch.

The maximum width and depth of the slots 84 is approximately 0.02 inch.

The minimum diameter of the throat 47 is 0.116 inch. The inside diameter of the air hole 48 is 0.062 inch. The maximum diameter of the throat 47 is 0.25 inch.

The minimum diameter of the inlet 93 for the siphon break vortex chamber 35 is 0.055 inch. The maximum internal diameter of the chamber is 0.335 inch.

The inside diameter of the outlet 95 is 0.055 inch.

As noted above, a siphon break 35 is incorporated in the conduit 59 between the reservoir 33 and the outlets 61. The primary purpose of this siphon break is to prevent flow of liquid through the conduit 59 when the engine is is an off, idle, or decelerated condition of operation.

The siphon break 35 actually breaks the connection to prevent syphoning of fluid under these conditions of operation. The syphon break 35 includes a vortex chamber 91 having an air inlet 93 and an outlet 95 for introducing a variable amount of air into the conduit 59, depending upon an indirect relationship to the amount of vacuum seen by the outlet end 61 of the conduit 59.

Thus, at engine idle, there is little flow of exhaust gas through the conduit 47 and therefore almost no suction at the outlet end 61 of the conduit 59.

However, even though there is low suction around the outlet 61 at low power, there can be enough suction to produce some flow through the conduit 59 at idle, if the siphon break were not incorporated in the system 21.

The vortex chamber type siphon break 35 provides a variable impedance which makes the siphon break practical and useful for insuring the cut-off of liquid flow to the conduit 59 at low power.

This is best understood by reference to FIG. 4, showing a conventional, prior art type of siphon break, comprising just an opening 97 in a side wall of the conduit 59. With this prior art type of siphon break, the opening 97 must be made so small (to permit liquid to be siphoned through the conduit 59 during operation of the engine at high power levels) that the opening 97 could not provide any insurance against some flow of liquid through the conduit 59 at engine idle. The required small size of the opening 97 is also compounded by the capillary effect which can have the result of closing off the opening 97 by the capillary action of the fluid itself in the conduit 59.

In contrast, the siphon break 35 shown in FIG. 1 and incorporating a vortex chamber 91 utilizes a relatively large opening 95 opening into the conduit 59 and is effective to restrict air bleed into the conduit 59 at low vacuums or under conditions of engine operation at higher power levels, because the vortex chamber 91 provides a high enough impedance to flow of air from the inlet 93 to the outlet 95 effectively to block off enough of the air flow so that the ratio of air to liquid in the conduit 59 is a quite low ratio when the engine is operating at higher rpm.

Thus, at higher power levels, the exhaust gas pressure in the conduit 41 is higher, producing increased rates of flow through the water vortex chamber 29, and this in turn produces increased suction at the outlet 61. The increased higher suction at the outlet 61 provides a greater pressure differential across the vortex chamber 91 and increases the impedance to flow through the vortex chamber 91. This in turn decreases the amount of air in relation to the amount of liquid which is permitted to flow through the conduit 59. The vortex chamber siphon break 35 thus creates its own increased impedance to flow with increased pressure differential across the vortex chamber, which is the result that is desired for the siphon break 35 in this system.

FIG. 5 shows another embodiment of a combustion control system constructed in accordance with the present invention. The system 22 shown in FIG. 5 is like the system 21 shown in FIG. 1, but utilizes a Venturi construction 101 in place of the liquid vortex chamber 29 shown in the FIG. 1 embodiment.

The Venturi 101 comprises a throat 103 and an expanded outlet 105. The conduit 59 is connected to an opening 107 in the side wall of the Venturi throat 103.

Exhaust gases flowing through the conduit 110 and the throat 103 pull fluid through the opening 107 in accordance with the recognized principle of Venturi operation 101. This does not provide a variable impedance like the liquid vortex chamber 29 of the FIG. 1 embodiment, but instead provides a multiplier effect of increasing liquid flow through the conduit 59 with increased exhaust gas pressure and resultant flow through the Venturi throat 103.

The Venturi 101 thus provides less impedance at engine idle than does the water vortex chamber 29 for the same orifice sizes (so that a proper amount of decoupling between the outlet 105 of the Venturi and the inlet 69 of the air vortex chamber 27 must be provided for), but the Venturi 101 does provide (because of the reduced impedance as compared to the vortex chamber) greater liquid flow at high engine power than does the water vortex chamber 29.

Further points of comparison between the operation of the liquid vortex chamber 29 of FIG. 1 and the Venturi 101 of FIG. 5 that are of interest include the following. The vortex chamber by its very nature tends to produce better mixing of fluid and gas than does the Venturi 101. The vortex chamber also tends to produce a hollow cone-shaped discharge in which the liquid droplets and vapor are distributed to the periphery of the cone while the interior tends to be substantially devoid of liquid droplets and filled only with gas (assuming that no tube-like extension on the outlet end of the vortex chamber is provided). The Venturi tends to provide a more homogeneous mixture of liquid droplets and vapor with gases than does the vortex chamber, and the Venturi 101 also tends to provide a somewhat greater ejector effect (again assuming that the vortex chamber does not incorporate any tube-like extension at the outlet end of the vortex chamber).

In the FIG. 5 embodiment illustrated, an optional spin chamber 108 has an inner surface aligned tangentially with the outlet 106 of a cross-over conduit 110. This produces a spin of gases at the inlet to the Venturi 101 as illustrated in FIG. 5. This spin produces greater impedance in the Venturi (as compared to a Venturi without the inlet spin) and the spin also provides greater control of the choking effect in the inlet 63.

FIG. 6 illustrates an inlet construction for the Venturi 101 having a multiple orifice disc 112 for imparting rotation to the gases flowing into the inlet of the Venturi.

In the FIG. 5 embodiment a modified construction of the innerconnecting tube 71 provides an increased degree of control. Thus, in the FIG. 5 embodiment, the ends 77 and 79 of the innerconnecting tube 71 are inclined at an angle so as to be opposed to the direction of incoming flow through the related inlets 73 and 63 rather than being aligned perpendicularly to such inlets as in the FIG. 1 embodiment. The controlling fluids flowing through the ends 77 and 79 thus oppose the flow being controlled through the inlets 73 and 63. The inertia of the controlling fluids opposes the inertia of the controlled fluids so that a greater control of the momentum is achieved than is the case when the openings 77 and 79 are aligned perpendicularly to the inlets 73 and 63.

In operation, the FIG. 5 construction provides a number of advantages.

The fluid flowing through the air inlet 63 is subjected to the velocity head of the fluid flowing through the tube 71 and out of the opening 79.

At idle the fluid flowing through the inclination of the tube end 79 permits some of the velocity head of the fluid flowing through the passageway 73 to be exerted through the tube 71 and against the inflowing exhaust gases in the passageway 73. This increases the effectiveness of the choking of the flow of exhaust gases at idle and deceleration.

The opposite condition occurs at increased power. As the exhaust gas pressure builds up and as the flow of exhaust gases increases, the velocity head of the exhaust gases is added to the static head, and this increased flow of gases through the tube 71 is introduced into the passageway 63 at an inclination so as to oppose the rotation and the flow of fluid through the passageway 63 at increased power levels of operation of the engine. This velocity head counteraction is in itself not desired, but the decrease of rotation compensates sufficiently to effectively open the throat 69; and the other mode of operation (the operation at idle and deceleration) of the angled opening 79 and 77 make this embodiment a useful construction.

This type of inclined, velocity head imposing construction can also be used to control other control elements, such as the other vortices and venturis.

The other structural components of the FIG. 5 embodiment, which bear the same reference numerals as the corresponding parts in the FIG. 1 embodiment, function in substantially the same way as described above in reference to the FIG 1. embodiment.

While not illustrated in the drawings, a preferred embodiment of the present invention also incorporates an additional cross tube, like cross tube 71, extending from the inlet 73 to the inlet 63 for providing controlled choking and elimination of the controlled choking of each of those inlets when the engine accelerates from idle or deceleration to an acceleration condition or to operation at cruise or high power.

The present invention thus provides a large number of variables for control of the mixture of air, fluid, exhaust gases and PCV gases introduced through the opening 23; and by proper selection and combination of the various control variables the relative amounts and total flow of all the components of the mixture can be matched to engine need at all the various operating conditions of the engine from engine off, through start up, idle, acceleration, steady state, and deceleration.

The control variables include: the impedance to flow produced by each vortex chamber 27, 29, 31, and 35; the manner in which the outputs of each of these vortex chambers are combined (both in terms of amount of flow and direction of spin of the output flow); the amount of coupling or decoupling between the various vortex chambers (including specifically the ejector coupling between the air vortex chamber and the exhaust gas vortex chamber and also the ejector coupling between the liquid vortex chamber or Venturi and the inlet to the air vortex chamber); by the choking effect provided at the respective inlets of each vortex chamber; an interconnection between the inlet of the air vortex chamber and the inlet of the PCV gas vortex chamber for changing the choking effects of these inlets in dependence upon changes in conditions of engine operation; and the variable impedance siphon break 35 for controlling the ratio of liquid to air to the liquid vortex chamber and for controlling the cut-off of liquid at low power and for controlling the rate of rise (how steep the curve gets in relation to engine need).

The overall result of the system 21 is to provide a no moving part fluidic computer for controlling the total amount and proportions of the mixture admitted to the inlet manifold in relation to engine need at various conditions of operation of the engine.

The fluidic computer also provides control of the heat amounts and the turbulence of the mixture admitted to the engine.

The system 21 actually provides more control variables than are needed, and this in itself is of benefit because it provides flexibility in selecting the optimum combination of control variables for a particular engine installation.

While I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A combustion control system for adding a fluid to the air-fuel mixture of the induction system of an internal combustion engine in response to engine need for the added fluid to improve the combustion of the fuel in the engine, said system comprising
variable impedance flow control means for producing an impedance to flow through the control means, which impedance varies in a non-linear relationship to the pressure differential across the control means and an acceleration of flow through the control means, said flow control means having inlet means and an outlet, the variable impedance flow control means including a first, air vortex chamber for producing rotation of the fluid flow through the control means, outlet means connecting the outlet of the variable impedance flow control means to the induction system of the engine, and input means for supplying a liquid and engine exhaust gas to the inlet means of the variable impedance flow control means, the input means supplying lean-out air to the variable impedance flow control means and PCV gases to the inlet means of the variable impedance flow control means.

2. A combustion control system for adding a fluid to the air-fuel mixture of the induction system of an internal combustion engine in response to engine need for the added fluid to improve the combustion of the fuel in the engine, said system comprising variable impedance flow control means for producing an impedance to flow through the control means, which impedance varies in a non-linear relationship to the pressure differential across the control means and an acceleration of flow through the control means, said flow control means having inlet means and an outlet, the variable impedance flow control means including a first, air vortex chamber for producing rotation of the fluid flow through the control means, outlet means connecting the outlet of the variable impedance flow control means to the induction system of the engine, said outlet means including a plurality of slots formed in the interior surface of the outlet of the first vortex chamber for generating turbulent mixing at high, ultrasonic frequencies, and input means for supplying a liquid and engine exhaust gas to the inlet means of the variable impedance flow control means.

3. A combustion control system for adding a fluid to the air-fuel mixture of the induction system of an internal combustion engine in response to engine need for the added fluid to improve the combustion of the fuel in the engine, said system comprising variable impedance flow control means for producing an impedance to flow through the control means, which impedance varies in a non-linear relationship to the pressure differential across the control means and an acceleration of flow through the control means, said flow control means having inlet means and an outlet, outlet means connecting the outlet of the variable impedance flow control means to the induction system of the engine, and input means for supplying a liquid and engine exhaust gas to the inlet means of the variable impedance flow control means, the variable impedance flow control means, outlet means, and input means providing a fluidic computer which combines the inputs of exhaust gas from the manifold near one cylinder, PCV outlet gases, liquid from the reservoir, and atmospheric air in proper amounts and proportions with no moving parts.

4. A combustion control system for adding a fluid to the air-fuel mixture of the induction system of an internal combustion engine in response to engine need for the added fluid to improve the combustion of the fuel in the engine, said system comprising variable impedance flow control means for producing an impedance to flow through the control means, which impedance varies in a non-linear relationship to the pressure differential across the control means and an acceleration of flow through the control means, said flow control means having inlet means and an outlet, the variable impedance flow control means including a first, air vortex chamber for producing rotation of the fluid flow through the control means, outlet means connecting the outlet of the variable impedance flow control means to the induction system of the engine, and input means for supplying a liquid and engine exhaust gas to the inlet means of the variable impedance flow control means, the input means including a shaped, air inlet for the first vortex chamber, and slots in the side wall of the inlet aligned generally tangentially with the inside surface of the inlet for producing a swirl of incoming air through the slots and effective to provide a choking effect which restricts the volume flow through the inlet.

5. A combustion control system for adding a fluid to the air-fuel mixture of the induction system of an internal combustion engine in response to engine need for the added fluid to improve the combustion of the fuel in the engine, said system comprising variable impedance flow control means for producing an impedance to flow through the control means, which impedance varies in a non-linear relationship to the pressure differential across the control means and an acceleration of flow through the control means, said flow control means having inlet means and an outlet, outlet means connecting the outlet of the variable impedance flow control means to the induction system of the engine, and input means for supplying a liquid and engine exhaust gas to the inlet means of the variable impedance flow control means.

6. The invention defined in claim 5 wherein the input means include apportioning means responsive to (a) the suction in the engine manifold via said outlet, (b) the exhaust gas pressure at said inlet means, and (c) the atmospheric pressure at the outside of the engine for varying the actual amount of said fluid supplied to said outlet and for varying the amount of liquid and the amount of exhaust gases relative to each other to provide them in amounts required by the engine for superior performance.

7. The invention defined in claim 5 wherein the input means comprise Venturi means for mixing exhaust gases with the liquid and for transmitting the mixed exhaust gases and fluid to the inlet means.

8. The invention defined in claim 7, wherein the Venturi means include a first shaped inlet for transmitting exhaust gases to the Venturi means and a second inlet for transmitting liquid to the throat area of the Venturi.

9. The invention defined in claim 8 wherein the variable impedance flow control means includes a first air vortex chamber for producing rotation of the fluid, flow through the control means, said vortex chamber having a shaped air inlet and the venturi shaped inlet includes a swirl chamber for producing a controlled choking of the inlet of the Venturi in relation to the pressure of the engine exhaust gases and also to provide a direction of spin at the outlet of the Venturi which can be used in a controlled way with respect to the direction of spin of the flow in the shaped inlet of the first vortex chamber to regulate the overall flow through the first vortex chamber.

10. The invention defined in claim 5, wherein the variable impedance flow control means include a first, air vortex chamber for producing rotation of the fluid flow through the control means.

11. The invention defined in claim 10 wherein the input means also supply lean-out air to the variable impedance flow control means.

12. The invention defined in claim 10, wherein the liquid is water.

13. The invention defined in claim 10 wherein the input means include a shaped, air inlet for the first vortex chamber.

14. The invention defined in claim 10 wherein the outlet means connect the outlet of the variable impedance flow control means to the inlet manifold downstream of the butterfly valve of the engine.

15. The invention defined in claim 14 wherein the input means includes offsetting means to offset changing conditions of vacuum below the butterfly valve with changing conditions of exhaust gas pressure of the engine and thereby to add the fluid in response to engine need.

16. A combustion control system for adding a fluid to the air-fuel mixture of the induction system of an internal combustion engine in response to engine need for the added fluid to improve the combustion of the fuel in the engine, said system comprising
   variable impedance flow control means for producing an impedance to flow through the control means, which impedance varies in a non-linear relationship to the pressure differential across the control means and an acceleration of flow through the control means, said flow control means having inlet means and an outlet, the variable impedance flow control means including a first, air vortex chamber for producing rotation of the fluid flow through the control means,
   outlet means connecting the outlet of the variable impedance flow control means to the induction system of the engine, and
   input means for supplying a liquid and engine exhaust gas to the inlet means of the variable impedance flow control means,
   the inlet means comprising a PCV-exhaust-gas vortex chamber having an outlet opening into the first vortex chamber and having an exhaust gas inlet connected to the exhaust gas manifold for supplying exhaust gases to the PCV-exhaust-gas vortex chamber and having a PCV inlet connected to the crankcase of the engine for conducting PCV gases to the inlet of the PCV-exhaust-gas vortex chamber.

17. The invention defined in claim 16 wherein said PCV inlet also has an air bleed opening for conducting bleed air in combination with the PCV gases through the PCV inlet of the PCV-exhaust-gas vortex chamber.

18. The invention defined in claim 16, including a restrictor in the PCV inlet to the third vortex chamber for controlling the volume flow of the PCV gases through the PCV inlet.

19. The invention defined in claim 16 wherein the exhaust gas inlet of the PCV-exhaust-gas vortex chamber has a changing internal diameter to permit controlled choking of the gases flowing therethrough by producing a swirl of the gases in the exhaust gas inlet.

20. The invention defined in claim 16 wherein the outlet of the PCV-exhaust-gas vortex chamber is positioned within the interior of the first vortex chamber at a location to produce an ejector effect to increase the total flow through the first vortex chamber with increasing engine power and exhaust gas pressure.

21. The invention defined in claim 16 wherein the direction of swirl of flow from the outlet of the PCV-exhaust-gas vortex chamber is opposed to the direction of swirl produced in the first vortex chamber on flow entering by an air inlet of the first vortex chamber to provide a controlled reduction of the variable impedance produced by the flow through the air inlet alone of the first vortex chamber.

22. The invention defined in claim 16 wherein the direction of swirl of flow from the outlet of the PCV-exhaust-gas vortex chamber is in the same direction as the swirl produced on flow entering by an air inlet of the vortex chamber to provide a controlled increase of the variable impedance produced by the flow through the air inlet alone of the first vortex chamber and to maximize the turbulence generated by the two swirl patterns.

23. The invention defined in claim 16 including means for mixing exhaust gases with PCV gases and air in the PCV-exhaust-gas vortex chamber in proportions and amounts to oxidize the hydrocarbons of the PCV gases by high temperatures or combustion within the PCV-exhaust-gas vortex chamber before these PCV gases are mixed with the liquid and air in the first vortex chamber, thereby to prevent the gumming up of the components of the combustion control system that tends to result from mixing unburned hydrocarbons in the PCV gases with the liquid.

24. The invention defined in claim 16 having means for providing precombustion reaction burning of the PCV hydrocarbon products in the PCV-exhaust-gas vortex chamber to prevent gum formation in the control system.

25. A combustion control system for adding a fluid to the air-fuel mixture of the induction system of an internal combustion engine in response to engine need for the added fluid to improve the combustion of the fuel in the engine, said system comprising
   variable impedance flow control means for producing an impedance to flow through the control means, which impedance varies in a non-linear relationship to the pressure differential across the control means and an acceleration of flow through the control means, said flow control means having inlet means and an outlet,
   the variable impedance flow control means including a first, air vortex chamber for producing rotation of the fluid flow through the control means,
   outlet means connecting the outlet of the variable impedance flow control means to the induction system of the engine, and
   input means for supplying a liquid and engine exhaust gas to the inlet means of the variable impedance flow control means, the input means including a shaped air inlet for the first vortex chamber and a second, liquid-exhaust gas vortex chamber for mixing the liquid with the exhaust gases within the second vortex chamber,
   said second liquid vortex chamber having an outlet end aligned with but spaced from the air inlet of the first vortex chamber and having an exhaust gas inlet connected to the exhaust manifold of the engine for supplying engine exhaust gases to the interior of the second vortex chamber, and including a liquid reservoir, liquid conduit means for conducting liquid from the liquid reservoir to the second liquid vortex chamber, and said liquid conduit means having an open end located within the interior of the second liquid vortex chamber at a point of suction produced by the swirl of exhaust gases within the second liquid vortex chamber so that incoming exhaust gases draw liquid from said open end by suction for delivery to the air inlet of the first vortex chamber.

26. The invention defined in claim 25 having means at the second vortex chamber and the inlet to the second vortex chamber for providing a non-linear flow characteristic for the exhaust gases which produces a rectifier effect on the pulsations in the exhaust gas pressures, thereby to provide increased flow through an open flow passageway without a check valve.

27. The invention defined in claim 25, wherein the outlet of the second vortex chamber is physically spaced from the shaped air inlet of the first vortex chamber to provide both a space for air to flow in to the shaped inlet of the first vortex chamber and also to provide a controlled decoupling of the flow from the second vortex chamber to the first vortex chamber.

28. The invention defined in claim 27 having means for decoupling sufficient to control the suction produced on the end of the fluid conduit within the second vortex chamber, and for reducing the suction sufficiently at idle conditions of operation of the engine to prevent any flow of fluid out of the fluid conduit means at engine idle.

29. The invention defined in claim 25 including variable impedance siphon break means associated with the liquid conduit means for stopping flow of liquid to the second vortex chamber when the engine is off and for providing increasingly greater amounts of liquid with respect to air in the conduit means with increasing exhaust gas pressures of the engine corresponding to operation of the engine at higher power levels.

30. The invention defined in claim 29, wherein the variable impedance siphon break means comprise an additional vortex chamber having an inlet open to atmosphere and having an outlet connected to the liquid conduit means, and wherein the amount of air flowing from the inlet through the outlet and into the liquid conduit means varies in dependence upon the vacuum which exists between the inlet and the outlet so that said additional vortex chamber mixes a variable amount of air with the liquid in the liquid conduit means depending upon the suction produced on the outlet end of the liquid conduit means within the second vortex chamber.

31. The invention defined in claim 25, wherein the outlet of the second liquid vortex chamber is physically spaced from the air inlet of the first vortex chamber to permit air to flow through said space and into the air inlet of the first vortex chamber and
wherein the outlet of the second vortex chamber is also disposed within the shaped, air inlet of the first vortex chamber to produce an ejector effect on the air inflowing into the shaped air inlet.

32. The invention defined in claim 31 including slots in the sidewall of the shaped inlet located to cause a swirl of the air inflowing into the shaped inlet and wherein the direction of rotation of the mixed fluid and exhaust gases leaving the second vortex chamber is opposed to the direction of rotation produced by said slots thereby to produce a high impedance to flow through the shaped inlet of the first vortex chamber at idle and deceleration while providing progressively less choking on the flow through the shaped inlet as the exhaust gas pressure of the engine increases.

33. The invention defined in claim 25 wherein the inlet means comprise a third, PCV-exhaust gas vortex chamber, said third vortex chamber having an outlet opening into the first vortex chamber and having an exhaust gas inlet connected to the exhaust gas manifold for supplying exhaust gases to the third vortex chamber and having a PCV inlet connected to the crank case of the engine for conducting PCV gases to the inlet of the third vortex chamber.

34. The invention defined in claim 33, including a restrictor in the PCV inlet to the third vortex chamber for controlling the volume flow of the PCV gases through the PCV inlet.

35. The invention defined in claim 33 wherein the outlet of the third vortex chamber is positioned within the interior of the first vortex chamber at a location to produce an ejector effect to increase the total flow through the first vortex chamber with increasing engine power and exhaust gas pressure.

36. The invention defined in claim 33 wherein the direction of swirl of flow from the outlet of the third vortex chamber is opposed to the direction of swirl produced in the first vortex chamber on the flow coming in through the air inlet of the first vortex chamber to provide a controlled reduction of the variable impedance produced by the flow through the air inlet alone of the first vortex chamber.

37. The invention defined in claim 33 wherein the direction of swirl of flow from the outlet of the third vortex chamber is in the same direction as the swirl produced in the first vortex chamber on the flow coming in through the air inlet of the vortex chamber to provide a controlled increase of the variable impedance produced by the flow through the air inlet alone of the first vortex chamber and to maximize the turbulence generated by the two swirl patterns.

38. The invention defined in claim 33 wherein said PCV inlet also has an air bleed opening for conducting bleed air in combination with the PCV gases through the PCV inlet of the third vortex chamber.

39. The invention defined in claim 33 wherein both the shaped inlet of the first vortex chamber and the exhaust gas inlet of the third vortex chamber have a changing internal diameter to permit controlled choking of the gases flowing through the inlets by producing a swirl of the gases in each shaped inlet.

40. The invention defined in claim 39 including swirl-producing means in said shaped air inlet of said first vortex chamber for producing a swirl of air in said air inlet and a branch conduit interconnecting the air inlet of the first vortex chamber with the exhaust gas inlet of the third vortex chamber to permit changes of the relative pressures within the two inlets to produce flow through the branch conduit in one direction to produce substantial choking of flow through the exhaust gas inlet of the third vortex chamber at engine idle and deceleration while permitting flow through the branch conduit in an opposite direction to relieve the choking of the exhaust gas inlet to the third vortex chamber on engine acceleration and during other engine operating conditions which produce relatively high ex' ust gas pressures while also unchoking the air inlet of the first vortex chamber by conducting pressurized exhaust gases into said air inlet in a direction of swirl which is opposed to the direction of swirl produced by said swirl-producing means, thereby to relieve the choking in the air inlet to the first vortex chamber.

41. The invention defined in claim 33 including mixing means for the exhaust gases with PCV gases and air in the third vortex chamber in proportions and amounts to oxidize the hydrocarbons of the PCV gases by high temperatures or combustion within the third vortex chamber before these PCV gases are mixed with the liquid and air in the first vortex chamber, thereby to prevent the gumming up of the components of the combustion control system that tends to result from mixing unburned hydrocarbons in the PCV gases with the liquid.

42. The invention defined in claim 41 having heat-retention means for maintaining the heat of said third vortex chamber supplied thereto by said exhaust gases at a temperature range wherein the third vortex chamber provides precombustion reaction burning of the PCV hydrocarbon products to prevent gum formation in the control system.

* * * * *

UNITED STATES PATENT AND TRADEMARK OFFICE
CERTIFICATE OF CORRECTION

PATENT NO. : 4,183,338
DATED : January 15, 1980
INVENTOR(S) : John E. Lindberg

It is certified that error appears in the above-identified patent and that said Letters Patent are hereby corrected as shown below:

The "[*] Notice" in the left-hand column of the cover page should be deleted in its entirety.

Signed and Sealed this

Twentieth Day of January 1981

[SEAL]

Attest:

RENE D. TEGTMEYER

*Attesting Officer*     *Acting Commissioner of Patents and Trademarks*